Patented Oct. 11, 1932

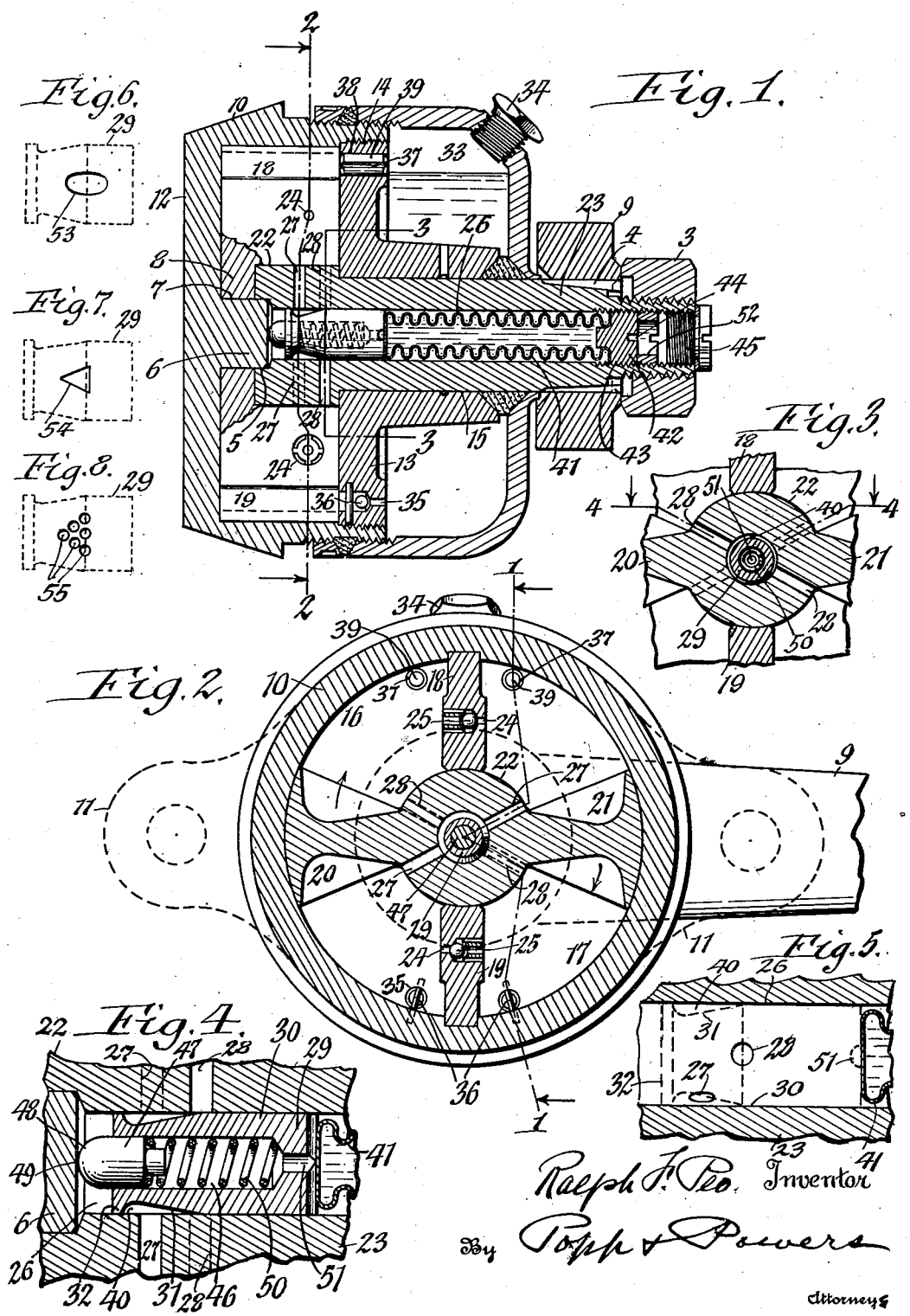

1,881,957

UNITED STATES PATENT OFFICE

RALPH F. PEO, OF KENMORE, NEW YORK, ASSIGNOR TO HOUDE ENGINEERING CORPORATION, OF BUFFALO, NEW YORK, A CORPORATION OF NEW YORK

SHOCK ABSORBER

Application filed October 18, 1930. Serial No. 489,641.

This invention relates to a thermostatic valve device for hydraulic shock absorbers whereby the shock absorbing liquid is permitted to flow more freely during low temperature and less freely during relatively high temperature and thus cause the shock absorber to work uniformly under various temperature conditions.

One of the purposes of this invention is to provide a thermostatic valve device of this character in which misalinement of the controlling valve and the bellows containing the temperature responsive liquid will not produce friction against the valve while the latter slides, thereby ensuring smooth thermostatic functioning of the mechanism and avoiding injury to the same.

Other objects of this invention are to so construct the thermostatic valve that the same is comparatively large, and therefore lends itself particularly well of use in a hydraulic shock absorber because it provides an annular viscous liquid controlling chamber of considerable length which is very desirable; also because it is easier, when working on a large diameter valve which floats freely to so proportion the orifices formed by the tapered portion of the valve that little or no end pressure will be exerted against the valve mechanism and reproduce accurate shapes.

In the accompanying drawing:

Figure 1 is a vertical longitudinal section of a hydraulic shock absorber embodying an approved form of my invention, taken on line 1—1 Fig. 2.

Figure 2 is a vertical cross section taken on line 2—2 Fig. 1.

Figure 3 is a fragmentary vertical cross section taken on line 3—3 Fig. 1.

Figure 4 is a fragmentary horizontal longitudinal section taken on the correspondingly numbered line in Fig. 3.

Figure 5 is a diagrammatic view showing the operative relation of the controlling valve and the by-pass ports with which the same cooperates. Figures 6, 7 and 8 show modified forms of the by-pass ports cooperating with the controlling valve.

In the following description similar characters of reference indicate like parts in the several figures of the drawing.

Although this hydraulic shock absorber is capable of use between any two relatively movable parts the same is more particularly intended for use in absorbing the shock to which automobiles are subjected by interposing the same between the axles of a car and the body which is mounted on the axles by a spring suspension system. The general organization of the shock absorber may also be varied as to details and the form shown in the drawing is to be taken merely as an example of one application of this invention. As there shown this shock absorber is constructed as follows:

The body of the shock absorber in the present case is provided with a cylindrical wall 10 which is adapted to be connected with the frame of an automobile by means of bolts passing through lugs 11 on opposite sides of this wall. At its inner or rear end the space within the wall is closed by a rear head 12 which is preferably formed integrally therewith, and at its front end this space is closed by a transverse front head or wall 13 which is connected with the circular wall by a screw joint 14 and provided with a forwardly projecting bearing 15. The cylindrical space within the circular wall and the front and rear heads of the body is divided into two segmental working chambers 16, 17 by a diametrical partition composed of upper and lower sections 18, 19. Within the working chambers 16, 17 two pistons 20, 21, oscillate back and forth, respectively, these pistons being formed on opposite sides of a hub 22 which is arranged at the rear end of a rock shaft 23 journaled in the bearing 15 and is connected externally of the absorber by a rock arm 9, or any other suitable means, with an axle or adjacent part of the automobile so that when the spring system between the frame and axle is compressed the pistons will be moved backwardly in the working chambers with a low pressure stroke toward the low pressure ends of the working chambers, and when the frame and axle of the car separate during rebound of the spring system the pistons will be moved toward the high pressure ends of the working chambers, as indicated by the direction of the arrows associated with these pistons in Fig. 2.

This arm or lever 9 is compelled to turn with the rear end of the rock shaft 23 by means of a serrated joint 4 between these parts and a screw nut 3 applied to the front end of the shaft 23, and engaging the front side of the rock arm 9, as shown in Fig. 1.

The inner rear corners of the two partition sections 18, 19 are connected by a collar 8 which has a central opening 7, and the central part of the rear working chamber head is provided with a pivot pin 6 which projects forwardly through the opening 7 and terminates a short distance in front of the collar 8 and into a counterbore 5 at the rear end of the hub 22, thereby serving as a centering means for the partitions 18 and 19, and also as a rear bearing for the hub 22 which connects the pistons 20 and 21 with the shaft 23, and also serves as an abutment for the thermostatic valve mechanism which will be described later on.

Each of the partition sections 18 and 19 contains a port 24 which is controlled by a check valve 25 so that during the low pressure stroke of the pistons the resistance liquid which is present in the working chambers can flow from the upper low pressure end of the right working chamber 17 to the upper high pressure end of the left working chamber 16, and from the lower low pressure end of the left working chamber 16 to the low high pressure end of the right working chamber 17; but during a reversed movement of the pistons these check valves are closed and prevent the flow of resistance liquid through the partition sections so that a greater resistance is offered to the movement of the pistons during the high pressure strokes than during the low pressure strokes of the same. In front of the working chambers is arranged a replenishing chamber 33 which is adapted to hold a reserve supply of resistance liquid and feed the same to the working chambers as required. This liquid is introduced into the replenishing chamber through an opening in its top which is normally closed by a screw plug 34 and is delivered to the lower ends of the working chambers through one or more replenishing ports 35 formed in the lower part of the front wall 13 and controlled by check valves 36 opening toward the working chambers, but closing toward the replenishing chamber.

For the purpose of permitting any air which is present in the resistance liquid within the working chambers to escape the upper end of one or both, of the working chambers is connected by vent passages 37 extending through the front wall of the working chambers from the upper ends of the working chambers to the upper end of the replenishing chamber, each of these vent passages being preferably formed between the horizontal opening 38 in the wall 13 and a plug 39 secured in said opening. These vent passages permit not only the escape of air from the working chambers into the replenishing chamber but also permit a small amount of the resistance liquid to pass from the working chambers to the replenishing chamber.

It has been found in practice that in winter time or in cold weather the viscosity of the resistance liquid increases due to the contraction of the same and therefore flows less freely through the partition sections than it does in the summer time or in warm weather when the liquid is expanded and thinned out, and therefore less viscous, thereby causing the shock absorber, in the absence of any provision to prevent it, to operate irregularly under different temperature conditions.

In order to enable the shock absorber to work uniformly under all temperature changing conditions a thermostatic valve mechanism is provided which is responsive to variations in temperature and operates to open passages connecting the working chambers on opposite sides of the pistons when the resistance liquid becomes more viscous in cold weather but automatically closes the same more or less when the resistance liquid becomes less viscous when the temperature increases.

In its preferred embodiment, this thermostatic valve mechanism is constructed as follows:

The numeral 26 represents a valve chamber of cylindrical form arranged axially in the shaft 23 and extending from the front end thereof to the counter bore 5 at the rear end thereof. The hub 22 of the pistons is provided with two rear by-pass ports 27, 27 which extend from the rear part of the bore of the valve chamber 26 to the periphery of this hub adjacent to the low pressure sides of the pistons 20, 21. The numeral 28 represents two front radial ports extending from the front part of the bore of the valve chamber 26 within the hub 22 to the periphery of the latter adjacent to the high pressure sides of these pistons.

Within the rear part of the valve chamber is arranged a controlling valve 29 which is provided with a cylindrical front part 30 fitting the bore of the valve chamber 26 so as to be capable of sliding freely therein, a rearwardly tapering neck 31 extending rearwardly from the front cylindrical part 30 of the controlling valve, and an annular flange 32 arranged at the rear end of the neck and slidingly engaging with the adjacent part of the bore of the valve chamber. The tapering neck of the controlling valve forms an annular forwardly flaring controlling passage 40 between the central part of the controlling valve and the bore of the valve chamber, which passage is of comparatively large area at its rear end and of gradually decreasing area toward its front end due to the tapering shape of the neck of the controlling valve, as best shown in Fig. 4.

In this normal position of the controlling valve the comparatively high or large diameter part of the neck of this valve is arranged opposite the inner ends of the high pressure by-pass ports 28, and the comparatively low or small diameter part of the tapering neck of the valve is arranged opposite the low pressure by-pass ports 27, as shown in Fig. 1. Means are provided whereby this controlling valve is moved forwardly so as to increase the cross sectional area of the controlling passage 40 and permit the resistance liquid to pass more freely through the same from the high pressure ports 28 which communicate with the high pressure ends of the working chambers to the low pressure ports 27 which communicate with the low pressure ends of these working chambers; but when the controlling valve is moved rearwardly the enlarged part of the controlling valve gradually reduces the cross sectional area of the clearance or controlling passage 40 adjacent to the inner ends of the high pressure ports 28, and thereby reduces the freedom of flow of the liquid through this controlling passage from the high pressure ports 28 which communicate with the high pressure ends of the working chambers to the low pressure ports 27 which communicate with the low pressure ends of the working chambers.

This longitudinal movement of the controlling valve is effected automatically by means which are responsive to temperature changes and the thermostatic means employed for this purpose, preferably consisting of a bellows diaphragm 41 arranged in the central part of the valve chamber and having a closed inner or rear end which bears against the front or outer end of the controlling valve, while the rear end of this diaphragm is secured to a head 42 which is connected by means of a screw joint 43 with the bore of the valve chamber, as shown in Fig. 1. This bellows diaphragm is filled with a liquid which is sensitive to temperature changes and will readily contract and cause the diaphragm to shorten when the temperature becomes colder, and also readily expand for causing the diaphragm to lengthen when the temperature becomes warmer.

The position of the diaphragm and the controlling valve within the valve chamber may be regulated for the purpose of bringing the tapering neck of the valve in the desired relation to the by-pass ports to suit different conditions by turning the head 42 in one direction or the other, so as to cause the same to move either inwardly or outwardly in the valve chamber, this turning movement of the head 42 being preferably effected by providing the outer or front end of the same with a nick 44 adapted to receive a screw driver or similar instrument which is inserted through the front end of the valve chamber, while the latter is open. Turning of the head 42 after adjustment is prevented by a locking ring or nut 52 working in the internally threaded outer or front part of the valve chamber and engaging with the front side of the head 42 of the bellows, as shown in Fig. 1. After this adjustment has been effected the front end of the valve chamber may be closed by means of a screw plug 45, as shown in Fig. 1.

The rear end of the diaphragm is not physically connected with the front end of the controlling valve but merely bears against the same loosely, thereby permitting the controlling valve to bear freely against the bore of the valve chamber and float therein during its longitudinal movements without being restrained in any way by the bellows diaphragm, thereby avoiding the possibility of the controlling valve engaging the bore of the valve chamber eliminating undue friction, as would be liable to occur if this valve were physically connected with the bellows diaphragm and these two members were not in exact alinement with each other.

The controlling valve is yieldingly held in engagement with the bellows diaphragm by spring tension means, which latter are combined with pivoting means whereby the controlling valve is pivotally engaged with the front side of the abutment 6 so as to permit the valve to turn freely with the hub of the pistons during the oscillating movement of the latter, while the apparatus is in use. These tension and pivoting means are preferably constructed as follows:

Formed axially in the rear part of the controlling valve 29 is a recess or pocket 46 of comparatively large diameter which opens through the rear end of this valve, and in the rear end of this recess or pocket is arranged a longitudinally movable bearing button 47 which is provided at its rear end with a spherical face 48 which bears against the front face 49 on the abutment 6, as shown in Fig. 4. Within the recess or pocket 46 is arranged a helical spring 50 which bears at its front end against the bottom of the recess 46 and at its rear end against the front end of the bearing button 47. By this means the front end of the controlling valve is held in engagement with the rear end of the diaphragm 41 and the pivot button 47 is held in engagement with the abutment on the body of the instrument, and permits the valve to turn on this abutment with the pistons without undue friction or wear.

In order to prevent any resistance liquid from being trapped in the front part of the valve chamber around the bellows diaphragm, a bleeder hole or passage 51 of comparatively small diameter is formed in the front end of the controlling valve and extends from the front end thereof to the bottom of the recess 46, whereby any liquid which may enter the front part of the valve chamber is free to escape through this bleeder hole and to the working chambers, thereby equalizing the pressure on the valve and avoiding interference with the sensitive operation of the thermostatic valve mechanism.

In order to avoid undue wear of the bearing button 47 the same is preferably made of hardened steel or other suitable material so that the same will always bear practically at one point against the abutment 49 and thereby insure long life of the same.

By avoiding any physical connection between the controlling valve and the bellows diaphragm this valve can be machined more readily and by simple means and at lower cost. It also permits of employing a valve of larger diameter which can be handled more readily in course of manufacture, and a more accurate seal against leakage of liquid around the controlling valve is obtained, inasmuch as no lateral pressure is exerted against this valve which might cause the same to wear unevenly as would be the case if the controlling valve and the bellows diaphragm were made in one piece and these members were slightly out of line relatively to each other and the diaphragm exerted a lateral pressure against the controlling valve. It has been found by past experience that it is very difficult, if not impossible, to line up the controlling valve perfectly with the externally threaded head of the front end of the bellows, and if such misalinement exists, a sliding friction of the controlling valve against the bore of the valve chamber occurs which prevents a smooth thermostatic functioning of the mechanism, and in some cases is liable to cause destruction of the mechanism due to the bellows remaining extended while the surrounding and expansible parts contract, so that during the initial movement of the shock absorber, when put into use, the large cylindrical front end or head of the controlling valve would act in the manner of a piston and drive against the rear end of the bellows in such manner that the latter will became injured.

By making the controlling valve of the form shown in the drawing the same can be made of comparatively large diameter so that the same can float or move more freely in response to variations in temperature and it is also easier to so proportion the controlling space 40 between the tapering neck of the controlling valve and the cylindrical bore of the valve chamber, so that little or no outward end pressure will be exerted by the resistance liquid against the controlling valve and the parts associated therewith.

The use of a controlling valve of comparatively large diameter is also very well suited for use in hydraulic shock absorbers inasmuch as it permits the use of an annular controlling space between the controlling valve and the bore of the valve chamber which is of considerable length, and therefore permits of a better regulation of the flow of the resistance liquid in accordance with the viscosity of the same due to temperature changes.

In the operation of this shock absorber it has been recognized that the viscosity change in the resistance fluid varies increasingly as the temperature varies. It therefore follows that the viscosity of the liquid and the corresponding hydraulic strength of a viscously controlled shock absorber is approximately proportional to the square of the temperature change; for example, if the temperature increases, then the viscosity of the resistance liquid will become less to a proportionately greater degree.

Controlling valve means have therefore been here provided which can be easily manufactured and which inclosing, due to increase in heat, closely corresponds to the strength change in the instrument resulting from the change in viscosity of the liquid which is approximately proportional to the square of the temperature change.

Although various means may be employed for accomplishing this purpose it is preferable to so construct the by-pass ports which cooperate with the controlling valve that the same present the maximum width to the valve when the latter is in its full open position but when the valve is moved rearwardly from its full open position due to an increase in temperature then some of the by-pass ports are closed proportionally at a faster rate.

As shown in Fig. 5 each of the front by-ports 28 is round or cylindrical in form. Under the lowest temperature which the instrument is likely to be used the controlling valve is arranged in the valve chamber with the highest part of the inclined controlling face on its neck in line with the center of the front by-pass ports 28, as shown in Figs. 1, 4 and 5, thereby permitting the resistance liquid to flow at the fastest rate through said ports from one side of the piston to the other and presenting a normal resistance to the movement of the pistons in the working chambers during relatively low temperature conditions.

As the temperature increases the thermostatic liquid in the bellows expands and moves the controlling valve rearwardly so that the latter closes the front by-pass ports 28 to a greater extent whereby the flow of the resistance liquid through said ports is restricted or retarded to a greater extent. Instead however of merely cutting down the flow of the resistance liquid progressively by this movement of the controlling valve, the closing effect of this valve on said by-pass ports increases proportionally due to the inclined formation of the face of the controlling valve and the form of the by-pass ports 28, which latter gradually become narrower from the central parts toward the rearmost parts.

It follows from this construction of the valve that the controlling space 40 between the valve face and the by-pass ports 28 gradually become smaller in sectional area as the highest part of the inclined valve face approaches the rearmost edge of the cylindrical by-pass ports 28 but the working of the latter also becomes smaller at an increasing rate in proportion to the extent of movement of the valve under the action of the expanding thermostatic liquid. As a consequence the thermostatic liquid as it expands closes the by-pass ports 28 at a relatively faster rate and thereby compensates for the character of viscosity of the resistance liquid which becomes more limpid or thinner at a faster rate and therefore flows more freely as the temperature rises than the rate of expansion of the thermostatic liquid which operates the bellows and the controlling valve.

As the controlling valve again moves forwardly when the temperature lowers the inclined face of this valve in cooperation with the forwardly enlarging areas of the by-pass ports 28, it again increases the area of the by-pass for the resistance liquid but at a progressively faster rate in order to permit the resistance liquid to flow with less obstruction during lower temperature conditions when the resistance liquid is more viscous or thick.

For all intents and purposes the front half of each round bypass port 28 is not utilized as a part of the area of this port but it is preferable to make the port round from a manufacturing stand-point. If desired however the by-pass port which cooperates with the inclined face of the controlling valve may be oval, as shown at 53 in Fig. 6, or triangular as shown at 54 in Fig. 7, or the same may consist of a plurality of small openings 55 arranged for instance as shown in Fig. 8.

From the foregoing it will now be clear that this thermostatic valve mechanism provides two variables, the shape and size of the by-pass ports and the shape of face of the controlling valve cooperating therewith.

It is possible in the construction shown to so proportion the valve that any strength change in the instrument would cause a temperature variation to be corrected by the valve action and thus cause the instrument to work uniformly under varying temperature conditions, inasmuch as the viscous control of this valve attains a practically uniform strength of the instrument regardless of the varying viscosity changes.

In the drawing it is assumed that the ports 28 are the high pressure by-pass ports, but if desired the ports 27 may be utilized as high pressure ports by reversing these ports 27, 28 relative to the piston and controlling valve.

I claim as my invention:

1. In a thermostatically controlled valve mechanism for use in hydraulic shock absorbers comprising a valve chamber connected by ports with the high and low pressure chambers at opposite sides of the piston of a hydraulic shock absorber, a valve slidable lengthwise in a part of said valve chamber and having a tapering section cooperating with said ports for the variable flow of fluid from one to the other, and a thermostat element secured at one end and engaging at its other end against said valve but unattached thereto.

2. In a thermostatically controlled valve mechanism for use in hydraulic shock absorbers comprising a valve chamber connected by ports with the high and low pressure chambers at opposite sides of the piston of a hydraulic shock absorber, a cylindrical valve slidable in said chamber and having intermediate its ends a circumferential channel of varying depth for spanning said ports for the variable flow of fluid from one port to the other, and means under control of the temperature of the liquid in said shock absorber for controlling the shift of said valve and thereby the location of said channel relative to said ports.

3. In a thermostatically controlled valve mechanism for use in hydraulic shock absorbers comprising a valve chamber connected by ports with the high and low pressure chambers at opposite sides of the piston of a hydraulic shock absorber, a valve slidable lengthwise in said valve chamber and cooperating with said ports to control the flow of liquid from one port to the other, a bellows diaphragm secured at one end and bearing loosely at its other end against one end of said valve, and a spring for holding said valve in engagement with said bellows.

4. In a thermostatically controlled valve mechanism for use in hydraulic shock absorbers comprising a valve chamber connected by ports with the high and low pressure chambers at opposite sides of the piston of a hydraulic shock absorber, a cylindrical valve slidable in said chamber and having intermediate its ends a circumferential channel of varying depth for spanning said ports for the variable flow of fluid from one port to the other during operation of the shock absorber, a thermostat element responsive to the temperature of the liquid of said shock absorber to shift said valve in one direction, and yielding means for shifting said valve in the opposite direction.

5. In a thermostatically controlled valve mechanism for use in hydraulic shock absorbers comprising a valve chamber connected by ports with the high and low pressure chambers at opposite sides of the piston of a hydraulic shock absorber, a valve slidable in said chamber and having a channel of varying cross section for spanning said ports for the variable flow of fluid from one port to the other, a thermostat element responsive to increase in temperature to shift said valve in one direction, and a spring for shifting said valve in the opposite direction.

6. In a thermostatically controlled valve mechanism for hydraulic shock absorbers comprising a valve chamber connected by ports with the high and low pressure chambers at opposite sides of the piston of a hydraulic shock absorber, a valve slidable lengthwise in said chamber and having intermediate its ends a channel of varying depth for spanning said ports for the variable flow of fluid from one port to the other, a thermostat element bearing loosely against one end of said valve, an abutment at the opposite end of said valve, said valve having an axial recess, and spring means arranged in said recess and bearing at opposite ends against said abutment and the bottom of said recess and operating to hold said valve in engagement with said thermostat element.

7. In a thermostatically controlled valve mechanism for hydraulic shock absorbers comprising a valve chamber connected by ports with the high and low pressure chambers at opposite sides of the piston of a hydraulic shock absorber, a valve slidable in said chamber to span said ports for the variable flow of fluid from one to the other, a thermostat element in said valve chamber loosely engaging against one end of said valve and responsive to temperature change to shift said valve in one direction, said valve having an axial recess, a bearing button arranged in the end of said recess for engagement with the end wall of said chamber, and a spring in said recess interposed between said button and the recess bottom for holding said valve against said thermostat element and for shifting said valve in the opposite direction.

8. In a thermostatically controlled valve mechanism for use in hydraulic shock absorbers comprising a valve chamber connected by escapement ports with the high and low pressure chambers respectively at opposite sides of the piston of a hydraulic shock absorber, a valve slidable lengthwise in said chamber and having a circumferential channel of varying cross sectional area for spanning said ports, means responsive to change in temperature of the liquid flowing through said ports for shifting said valve, said channel increasing in cross sectional area and one of said ports decreasing in width in the direction of shift of said valve under temperature increase, said channel and said ports presenting maximum passage area when the temperature is at a substantially maximum low point, whereby upon shift of said valve with increase in temperature and decrease in viscosity the resistance to flow through said ports will be increased in correct proportion to the change in viscosity.

In testimony whereof I hereby affix my signature.

RALPH F. PEO.

DISCLAIMER 1,881,957.—*Ralph F. Peo*, Kenmore, N. Y. SHOCK ABSORBER. Patent dated October 11, 1932. Disclaimer filed March 22, 1935, by the assignee, *Houde Engineering Corporation.*

Therefore enters this disclaimer to claims 2, 4, and 5 of said United States Letters Patent, which are in the following words, to-wit:

"2. In a thermostatically controlled valve mechanism for use in hydraulic shock absorbers comprising a valve chamber connected by ports with the high and low pressure chambers at opposite sides of the piston of a hydraulic shock absorber, a cylindrical valve slidable in said chamber and having intermediate its ends a circumferential channel of varying depth for spanning said ports for the variable flow of fluid from one port to the other, and means under control of the temperature of the liquid in said shock absorber for controlling the shift of said valve and thereby the location of said channel relative to said ports."

"4. In a thermostatically controlled valve mechanism for use in hydraulic shock absorbers comprising a valve chamber connected by ports with the high and low pressure chambers at opposite sides of the piston of a hydraulic shock absorber, a cylindrical valve slidable in said chamber and having intermediate its ends a circumferential channel of varying depth for spanning said ports for the variable flow of fluid from one port to the other during operation of the shock absorber, a thermostat element responsive to the temperature of the liquid of said shock absorber to shift said valve in one direction, and yielding means for shifting said valve in the opposite direction.

"5. In a thermostatically controlled valve mechanism for use in hydraulic shock absorbers comprising a valve chamber connected by ports with the high and low pressure chambers at opposite sides of the piston of a hydraulic shock absorber, a valve slidable in said chamber and having a channel of varying cross section for spanning said ports for the variable flow of fluid from one port to the other, a thermostat element responsive to increase in temperature to shift said valve in one direction, and a spring for shifting said valve in the opposite direction."

[*Official Gazette April 9, 1935.*]